United States Patent [19]

Query et al.

[11] 4,160,336
[45] Jul. 10, 1979

[54] METHOD FOR TREATING FIREANTS

[76] Inventors: Grady W. Query, 1725 Matthews Mint Hill Rd., Matthews, N.C. 28105; O. Grady Query, 1742 Sam Rittenburg Blvd., Charleston, S.C. 29407

[21] Appl. No.: 876,204

[22] Filed: Feb. 9, 1978

[51] Int. Cl.² .............................................. A01M 7/00
[52] U.S. Cl. ................................................. 43/132 A
[58] Field of Search ................. 43/124, 132 R, 132 A; 111/6, 7.1, 7.4; 47/575

[56] References Cited

U.S. PATENT DOCUMENTS

| | | | |
|---|---|---|---|
| 1,140,453 | 5/1915 | Frank | 43/132 A |
| 1,267,889 | 5/1918 | Milne | 43/132 A |
| 1,290,544 | 1/1919 | Graumann | 43/124 |
| 2,862,765 | 12/1958 | Wing | 43/124 X |
| 3,540,837 | 11/1970 | Pascucci | 43/124 X |
| 4,005,976 | 2/1977 | Rombach | 43/124 X |

*Primary Examiner*—Nicholas P. Godici
*Attorney, Agent, or Firm*—Larry Harold Kline

[57] ABSTRACT

A method and apparatus for treating fireants is disclosed which combines an insecticide with a refrigerant into a mixture and injects the mixture into the fireant hills.

8 Claims, 3 Drawing Figures

METHOD FOR TREATING FIREANTS

This invention relates to a method and apparatus for controlling fireants and more particularly to a method and apparatus which are usable by persons with minimum risk to themselves.

Fireants are ferocious and have a powerful sting. Some of these ants have a sting strong enough to kill small animals and to be dangerous to humans. Some fireants eat insects and seeds, doing extensive crop damage. The fireant originates new colonies from existing colonies at rapid speed. Deep mounds and intricate tunnels further complicate the control or eradication of the fireant. Efforts have been previously made to eradicate the fireant by the use of baits and slow-acting poisons. These previous methods are slow, may have serious environmental impact, and often render treated areas unusable for periods of time after treatment.

The fireant is very quick and is a constant danger to a person attempting control or eradication methods. The present invention solves the many problems involved in controlling and eradicating the fireant.

An object of the present invention is a method of controlling the fireant by utilizing a quick-kill, non-residual insecticide in combination with a refrigerant and delivering that combination into the fireant colony utilizing a probing device.

Another object of the present invention is to stun and immobilize the fireant colony immediately at the time eradication is attempted in order to protect the person applying the eradication method from attack by fireants.

Still another object of the present invention is applying eradication mixture into a fireant colony under pressure thereby injecting the mixture deep into the tunnels and chambers of the colony due to the pressure.

A further object of the present invention is to stun, immobilize and disorient fireants immediately upon the application of an eradication mixture in order to prevent the immediate removal of pupae, eggs and the queen from the fireant colony by the fireants.

These and other objects and features of the invention will be apparent from the following description and appended claims.

Briefly, the invention is a method and apparatus for treating fireants in ant hills. The refrigerant immobilizes the fireants long enough for the insecticide to treat them. A maiming agent may also be added to the mixture. The mixture may be injected into the fireant hills under pressure. The insecticide may be a quick-killing, non-residual insecticide such as Pyrethrum. The refrigerant may be freon. The freon may act as a refrigerant and as a propellant. The maiming agent may be Rotenone. The apparatus for use in treating fireants in ant hills may comprise a mixture of an insecticide and a refrigerant; a plurality of storage tanks operative to hold the mixture; and injection means operative to remove the mixture from the storage tanks and to inject the mixture into the ant hills. The mixture may further comprise a maiming agent. The plurality of storage tanks may be attached to a back pack device. The plurality of storage tanks may be attached to a tank trailer. The injection means may comprise a rod with a penetrating shaft that may be placed within the ant hills; a control means operative to control the flow of the mixture through the rod; and hose means operative to connect the plurality of storage tanks with the rod. Switch means may control the flow of mixture from the plurality of storage tanks when more than one storage tank is utilized. The control means may be a squeeze lever connected on a handle to the rod. The insecticide may be Pyrethrum. The refrigerant may be freon. The maiming agent may be Rotenone.

The invention will be more fully understood from the following detailed description and appended claims when taken with the drawings in which:

Figure 3:
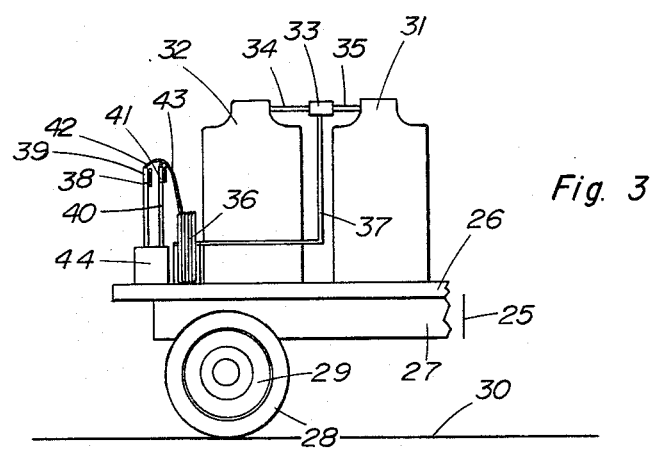

FIG. 3 is a plain view of tank trailer 25 holding tanks 31 and 32.

Figure 1:
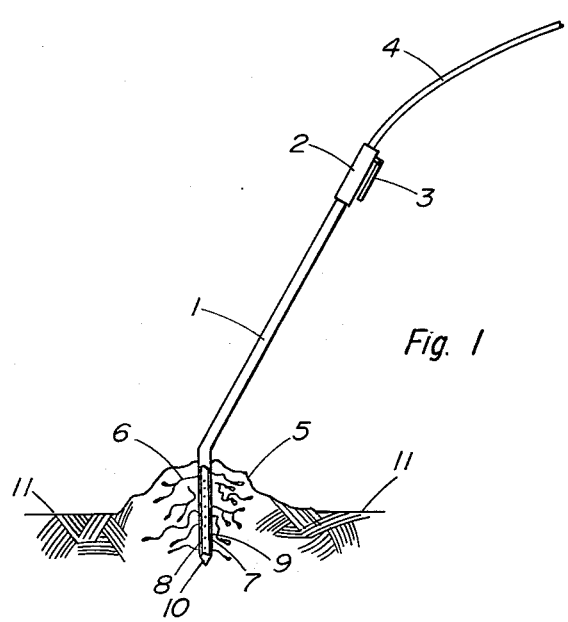
FIG. 1 is a plain, partially sectioned view of rod 1 being inserted into ant hill 5.

Referring now to the drawings, FIG. 1 is a plain, partially sectioned view of rod 1 being inserted into ant hill 5. Rod 1 is shown having penetrating shaft 7 inserted into ant hill 5. Ant hill 5 is a fireant hill in the ground 11. The fireant hill 5 comprises many tunnels such as tunnel 6 and many chambers. The probing device, or rod 1, has a handle 2 on which there is a squeeze lever 3. Squeeze lever 3 controls the flow of the eradication combination through hose 4. Holes in penetrating shaft 7, such as hole 8 and hole 9, enable the eradication mixture flowing from hose 4 to be dispersed inside the ant hill 5. The eradication mixture is dispersed under pressure deep inside the tunnels, such as tunnel 6. Solid pointed tip 10 of penetrating shaft 7 is useful as an aid in probing into the ant hill 5 and prevents dirt from entering through the tip of the penetrating shaft 7 and potentially clogging hole openings.

Figure 2:
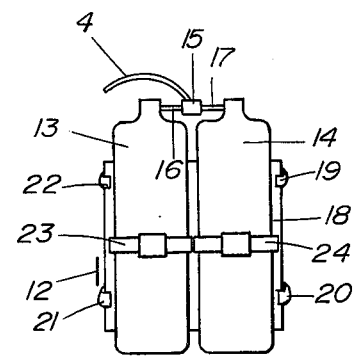
FIG. 2 is a plain view of a portable back pack device 1.

FIG. 2 is a plain view of a portable back pack device 12. This device may be worn by a person attempting to control or eradicate the fireants. The hose 4 is connected to a switching device 15. The switching device 15 controls through which tank, tank 13 or tank 14, the eradication mixture will be utilized. Connecting line 16 connects tank 13 to switching device 15. Connecting line 17 connects tank 14 to switching device 15. Tanks 13 and 14 are secured by tank support strap 23 and tank support strap 24 to tank harness 18. Straps 19, 20, 21 and 22 are available to secure the tank harness 18 to a person carrying the back pack device 12.

FIG. 3 is a plain view of tank trailer 25 holding tanks 31 and 32. The eradication mixture may be stored in tanks 31 and 32. Line 34 connects tank 32 to switching device 33. Line 35 connects tank 31 to switching device 33. Switching device 33 performs a similar function to the switching device 15 of the back pack device 12 shown in FIG. 2. Line 37 connects switching device 33 to a coil of hoses 36. From the coil of hoses 36, emanates hoses 42 and 43. Hose 42 connects coil 36 to the rod 38 with handle 39. Hose 43 connects coil 36 with rod 40 with handle 41. Rods 38 and 40 are stored in rod holding device 44. The tank trailer 25 shown in FIG. 3 shows two rods and, therefore, would be appropriate for two persons utilizing the method and apparatus of this invention. Other devices utilizing more rods are certainly within the scope of this invention. Tank trailer 25 is shown with a trailer bed 26 upon which the tanks 31 and 32 rest. Trailer frame 27 supports trailer bed 26. Wheel 29, with tire 28, is secured to trailer frame 27 and gives the tank trailer 25 mobility. Any plurality of wheels and tires may be utilized. The tires, such as tire 28, supports the tank trailer 25 on the ground 30.

The present invention includes the combination of a quick-kill, non-residual insecticide with a refrigerant. A maiming agent such as Rotenone may also be added to the combination. The quick-kill, non-residual insecticide may be Pyrethrum. The refrigerant may be freon. Freon may be utilized as a propellant and refrigerant. Any other desired quick-kill, non-residual insecticide other than Pyrethrum may be utilized. Any other maiming agent other than Rotenone that may be desired may be used. Any other propellant other than freon may be utilized. Any other refrigerant other than freon may be utilized.

The quick-kill, non-residual insecticide such as Pyrethrum is combined with freon, or any other refrigerant, and held under pressure in tanks such as tanks 13 and 14 of back pack device 12, or tanks 31 and 32 of tank trailer 25. A maiming agent such as Rotenone may also be added to the combination and held within the tanks. The pressurized combination, when injected through rods such as rods 1, 38 and 40 in the drawings, tend to immobilize and disorient the fireants. The combination tends to confine the fireants in the interior of the mounds long enough to protect the person treating the ant hill, and to give the insecticide time to kill. The pressurized, aerosol form of delivery of the combination tends to move the combination rapidly through the tunnels and chambers of the ant hill to give a total knock-down capability. Pressure relief valves and pressure regulators may be added to this system as desired, or required by the user. The initial injection of the combination tends to stun and immobilize the fireants, protecting the person applying the combination from attacks by the fireants. The pressurized application takes advantage of forcing the combination into the tunnels and chambers of the colony. The fireants are stunned, immobilized and disoriented, preventing the carrying off of pupae, eggs and the queen by fireants. Sub-colonies, or runners, are also reached through the tunnels. This invention has the capability of killing the queen and existing secondary queens, as well as reproductive males before they can escape. This invention can eliminate the large percentage of the workers of the colony and destroy nymphs.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

The refrigerant causes a reduction in temperature which reduces not only the body temperature of the organisms, but also the ambient air and ground temperature within the colony. This reduction of temperature causes an instinctive response by the fireants to seek a lower level. This response results in more protection to the person applying the mixture. There would also be a greater concentration of the fireants in the lower levels of the colony, therefore, subjecting them to a greater concentration of the insecticide in the mixture.

Compressed air, or carbon dioxide ($CO_2$), could be applied to the mixture containers during application during cold weather to increase the pressure under which the mixture is applied to the fireant hills.

Other types of insecticides such as a residual type, using the same method and apparatus for application as disclosed herein could be utilized to enhance the permanency of the application.

Other modifications and changes may occur to those skilled in the art without departing from the spirit and scope of the invention as defined by the appended claims.

I claim:

1. A method of treating fireants in ant hills comprising:
   (a) combining an insecticide and a refrigerant into a mixture;
   (b) injecting said mixture into said ant hills;
   whereby said refrigerant immobilizes said fireants long enough for said insecticide to treat said fireants.

2. A method according to claim 1 wherein a maiming agent is also combined in said mixture.

3. A method according to claim 1 wherein said mixture is injected into said ant hills under pressure.

4. A method according to claim 1 wherein said insecticide is a quick-kill, non-residual insecticide such as Pyrethrum.

5. A method according to claim 1 wherein said refrigerant is freon.

6. A method according to claim 5 wherein said freon acts as a refrigerant and a propellant.

7. A method according to claim 2 wherein said maiming agent is Rotenone.

8. A method according to claim 1 wherein said insecticide is Pyrethrum; said refrigerant is freon; said freon acts as a refrigerant and a propellant; and a maiming agent, Rotenone, is also combined in said mixture.

* * * * *